United States Patent [19]
Lynn et al.

[11] Patent Number: 5,444,781
[45] Date of Patent: * Aug. 22, 1995

[54] METHOD AND APPARATUS FOR DECRYPTION USING CACHE STORAGE

[75] Inventors: Kerry E. Lynn, Redwood City; Jonathan M. Zweig, Santa Clara; Richard W. Mincher, San Jose, all of Calif.

[73] Assignee: Apple Computer Inc., Cupertino, Calif.

[ * ] Notice: The portion of the term of this patent subsequent to Sep. 6, 2011 has been disclaimed.

[21] Appl. No.: 254,774

[22] Filed: Jun. 6, 1994

Related U.S. Application Data

[63] Continuation of Ser. No. 110,402, Aug. 23, 1993, Pat. No. 5,345,508.

[51] Int. Cl.6 .............................................. H04C 9/26
[52] U.S. Cl. ......................................... 380/46; 380/50
[58] Field of Search ........................ 380/43, 44, 46, 50

[56] References Cited

U.S. PATENT DOCUMENTS

| | | | |
|---|---|---|---|
| 4,429,180 | 1/1984 | Unkenholz | 380/43 |
| 4,797,922 | 1/9189 | Massey et al. | 380/46 |
| 4,815,130 | 3/1989 | Lee et al. | 380/43 |
| 4,817,148 | 3/1989 | Lafferty et al. | 380/46 |
| 4,827,514 | 5/1989 | Ziolko et al. | 380/46 |
| 4,994,008 | 7/1990 | Piosenka et al. | 380/46 |
| 5,067,156 | 11/1991 | Martin | 380/46 |
| 5,345,508 | 9/1994 | Lynn et al. | 380/50 |
| 5,363,448 | 11/1994 | Koopman, Jr. et al. | 380/43 |

Primary Examiner—Salvatore Cangialosi
Attorney, Agent, or Firm—John S. Ferrell; V. Randall Gard

[57] ABSTRACT

A method and apparatus for decryption using cache storage wherein imported ciphertext is decrypted to produce unencrypted plaintext data. As a communication sequence containing an initialization vector and a block of ciphertext is imported, the initialization vector is applied to a cache and to a decoder. The initialization vector is then compared with other initialization vectors stored in the cache to determine whether the specific initialization vector has previously been received and stored. If the specific initialization vector is found to be stored in the cache, then the PN sequence associated with that initialization vector is written to the decoder, and the stored PN sequence is used to decode the imported ciphertext.

If a determination is made that the initialization vector has not been previously received, then the read cache signal instructs the multiplexer to connect the PN generator to the decoder, and the initialization vector is used to generate a new PN sequence. In order to improve the efficiency of future ciphertext decoding utilizing this specific initialization vector, the PN sequence associated with the initialization vector is then stored in the cache together with its corresponding initialization vector. When the next block of ciphertext is received using the same initialization vector, the PN sequence need not be regenerated by the PN generator, but rather may be read from the cache as a stored sequence.

21 Claims, 8 Drawing Sheets

Prior Art

FIG. 1(a)

Prior Art

| IV | Sequence |
|---|---|
| IV 1 | Sequence 1 |
| IV 2 | Sequence 2 |
|  |  |
| IV n-1 | Sequence n-1 |
| IV n | Sequence n |

METHOD AND APPARATUS FOR DECRYPTION USING CACHE STORAGE

REFERENCE TO PARENT APPLICATION

This commonly assigned application is a continuation of application Ser. No. 08/110,402, filed Aug. 23, 1993 now U.S. Pat. No. 5,345,308. The inventors named in the parent application are named in this continuation application.

BACKGROUND OF THE INVENTION

1. Field of the Invention

This invention relates to data encryption, and more particularly to a method and apparatus for varying the computational overhead associated with encrypting and decrypting digital data signals by selectively reusing, according to the desired level of security, a pseudorandom encoding sequence at the transmitter end and by storing and reusing pseudorandom decoding sequences at the receiver end.

2. Description of the Background Art

Figure 1A:
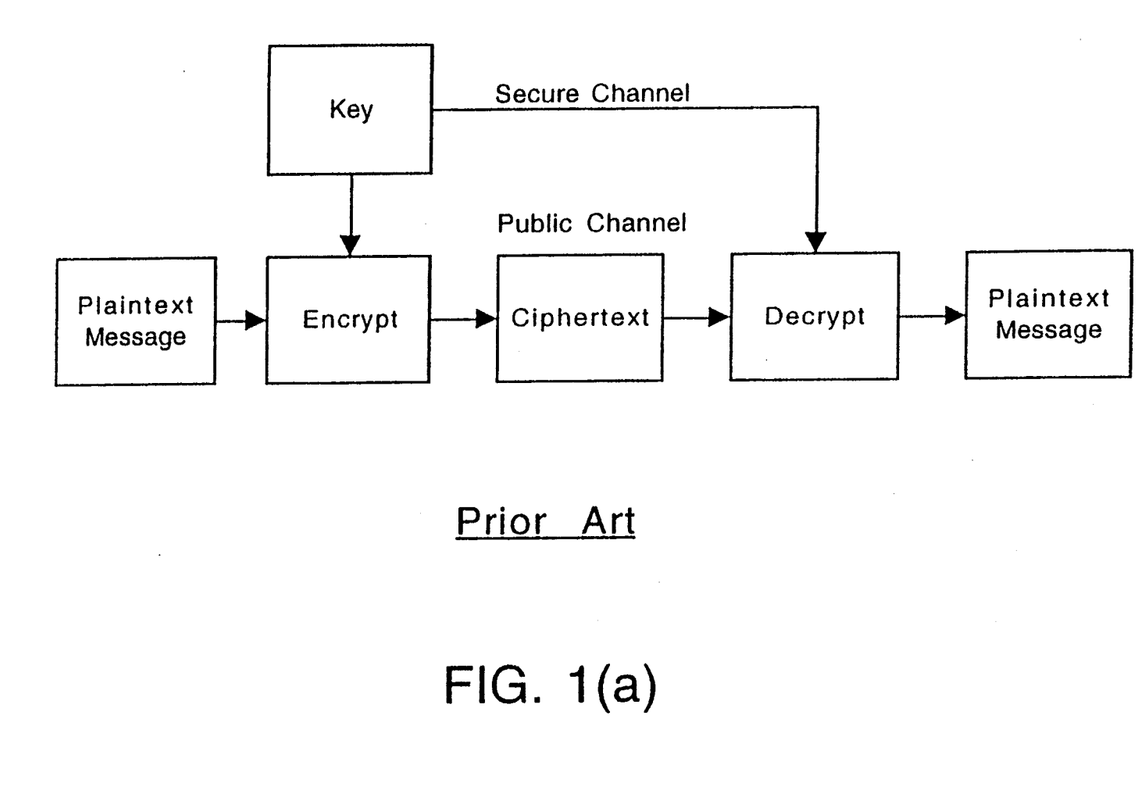
FIG. 1(a) is a block diagram showing a conventional symmetric key cryptosystem.

Data encryption is a function that ensures the privacy of a digital communication by preventing an unauthorized receiver from understanding the contents of a transmitted message. A conventional "symmetric key" cryptosystem is generally illustrated in FIG. 1(a). A transmitter transforms a plaintext message into ciphertext using an invertable encryption transformation. This transformation is a function of the plaintext input message and a secret key which is shared by both the transmitter and the receiver. The ciphertext is then transmitted over an unsecured public channel and the intended receiver of the message, also in possession of the secret key, applies the inverse transformation to decrypt the ciphertext and recover the original plaintext message. The secret key is communicated to a plurality of authorized users through a secure channel (for example, a secure Key Exchange Algorithm may be employed) and the key effectively dictates a specific encryption transformation from a family of cryptographic transformations. In general, any station in possession of the secret key may encrypt or decrypt messages.

A conventional cryptosystem can be said to exhibit "unconditional security" if the secret key is as long as the ciphertext message, each key is used only once, and all keys are equally likely. However, since most systems can be expected to transmit a large number of messages, the problem of distributing the key information becomes formidable. Most practical cryptosystems have short keys compared to the length of a message. The lessened security resulting from short keys is compensated for by relying on the complexity of the way that the key is combined with the data.

Figure 1B:
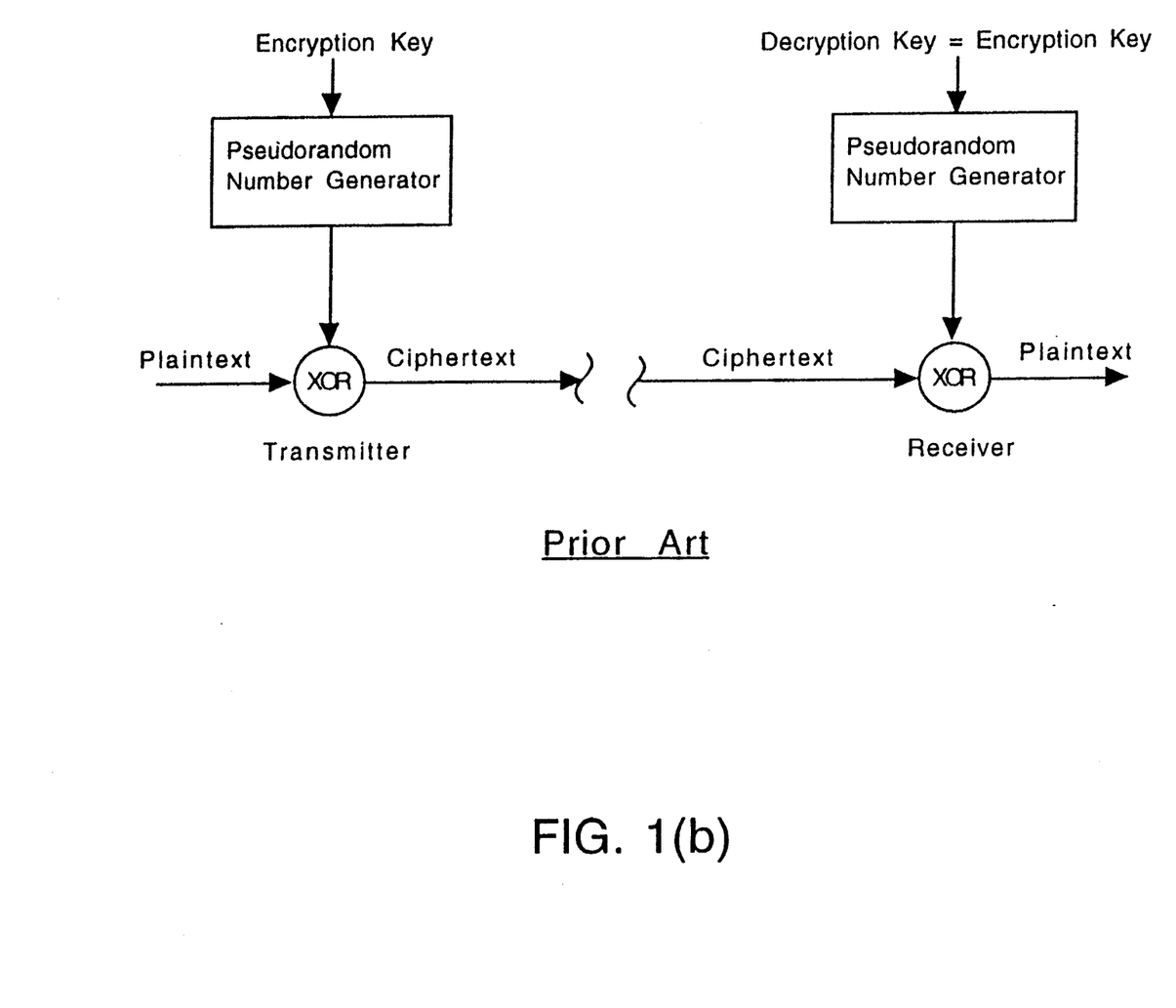
FIG. 1(b) is a block diagram showing an example electronic codebook cryptosystem of the prior art.

A particular example of a conventional cryptosystem, hereafter referred to as an electronic codebook, is generally illustrated in FIG. 1(b). The electronic codebook involves the use of a secret key that is shared by both the transmitter and the receiver. The transmitter utilizes the key to generate a deterministic, apparently random sequence of binary digits using a Pseudorandom Number (PN) generator. An essential feature of the PN generator is that with a specific key input, a unique PN sequence of arbitrary length may be generated. The PN sequence is then combined with the binary representation of the plaintext message to be encrypted to produce a sequence of ciphertext. The combination of the PN sequence and the plaintext must be accomplished using an invertable function. An invertable function is one that has a known inverse such that when the inverse function is applied to the ciphertext the original plaintext can be extracted. For example, two's complement addition or bit-wise exclusive-OR (XOR) are two widely used invertable functions, although other functions can be employed.

Decoding of the encrypted ciphertext may be performed by the receiver using a method identical to that used by the transmitter. Ciphertext is received from the transmitter and combined using a logical XOR gate, with a pseudorandom sequence generated by a PN generator identical to that used in the transmitter. The essence of the electronic codebook system is that an encryption key is used to generate a pseudorandom sequence in the transmitter side, and the identical sequence is then generated in the receiver when the same encryption key is applied to the receiver PN generator. The XOR gate in the receiver provides the inverse function of the XOR gate in the transmitter so that logical combination of the ciphertext and the PN sequence in the receiver produces the same plaintext that was originally encoded by the transmitter.

One drawback of the prior art system described is that the overhead of generating PN sequences is quite high, particularly relative to the overhead of applying the combination function. In practice, it is typical to generate and combine the PN sequence with a plaintext message of arbitrary length one character at a time, as needed. The characters of the PN sequence are discarded after a single use, so there is no opportunity to spread the cost of computing the sequence over several messages. The rate at which messages can be encrypted and decrypted is therefore limited by the speed at which the PN sequence can be produced. What is needed is a method for storing and reusing PN sequences in order to increase the transmission rate of messages through the cryptosystem.

Another drawback of the prior art system is that the receiver's PN generator may lose synchronization with that of the transmitter under some circumstances, necessitating additional recovery procedures in order for the plaintext to be recovered. For example, if the next character emitted by the PN generator is a function of the initial key input as well as the number of characters that have been previously emitted, and if the message is being communicated from the transmitter to the receiver in several fragments or packets, and if any packets are lost or received out of order, then it will first be necessary for the receiver to receive and arrange all the fragments in the proper order before decoding of the message can be accomplished. It is therefore desirable that a high speed cryptosystem exhibit the property of self-synchronization between transmitter and receiver such that no additional recovery procedures are required to decode messages.

SUMMARY OF THE INVENTION

In accordance with the present invention, an apparatus and method are described for variable overhead cached encryption and decryption. A transmitter unit is used for encoding or encrypting data and a separate authorized receiver decodes or decrypts the data. Both the transmitter and receiver share a common secret key that has been communicated through some separate channel. The transmitter combines the secret key (which serves as a constant base value) with an Initialization Vector (IV), using an XOR operation to produce a temporal key. This temporal key is then used as an input to a pseudorandom number (PN) generator to produce a unique PN sequence of binary digits, for each new temporal key entered. The generated PN sequence is equal in length to the longest anticipated message fragment. The initialization vector together with its corresponding PN sequence is then stored in a cache and the PN sequence is iteratively reused, as determined by a counter, to encrypt one or more plaintext messages. The counter is initialized to a maximum count value whenever a new PN sequence is generated, and the counter tracks reuse of the PN sequence to encrypt the number of messages specified by the maximum count value. When the maximum count value specifies that the PN sequence is to be used only once, the security afforded by the present invention will be high, but a new PN sequence must be generated for each message sequence transmitted and so the computational overhead will also be high. If the maximum count value specifies a maximum count value greater than one, the PN sequence stored in the cache will be reused to encrypt the maximum count number of message sequences. The resulting ciphertext messages will be more vulnerable to statistical cryptanalytic attack as the maximum count value increases. The PN sequence from the cache is combined with the plaintext data to be transmitted using an invertable combination function. An exclusive-OR (XOR) function is used in the preferred embodiment to produce a ciphertext message. The unencrypted initialization vector is then concatenated with the ciphertext, and together, both are exported by the transmitter to the receiver for decrypting. As each plaintext message is encrypted and exported, the value of the counter is decremented. If the value of the counter goes to zero then a new initialization vector is selected and the above steps are repeated for subsequent messages. A new initialization vector should be chosen with equal probability from the set of all possible initialization vectors since this has the desirable result of selecting a large number of different encoding sequences over the life of the secret key.

The encoded communication is imported by the receiver and the initialization vector portion is extracted. The receiver's cache of previously received initialization vectors is searched using the imported initialization vector as a search key to determine whether an entry exists for it in the cache. If the initialization vector has been previously received and stored, then the corresponding PN sequence has already been computed and stored and is available for decoding the imported ciphertext without having to regenerate the PN sequence. If the imported initialization vector is not found in the cache, then the associated PN sequence is not available and the receiver then combines the initialization vector with the secret key to produce a temporal key and corresponding PN sequence identical to the sequence used by the transmitter to encode the data. This PN sequence is then combined with the ciphertext, using an XOR gate, to recover the original plaintext from the ciphertext. The initialization vector and corresponding newly generated PN sequence are then stored in the receiver cache, to be available for comparison with subsequently received initialization vectors. Utilization of this cache can greatly reduce the overhead associated with generating PN sequences, particularly when higher count values are used by a given transmitter.

DESCRIPTION OF THE PREFERRED EMBODIMENT

Figure 4A:
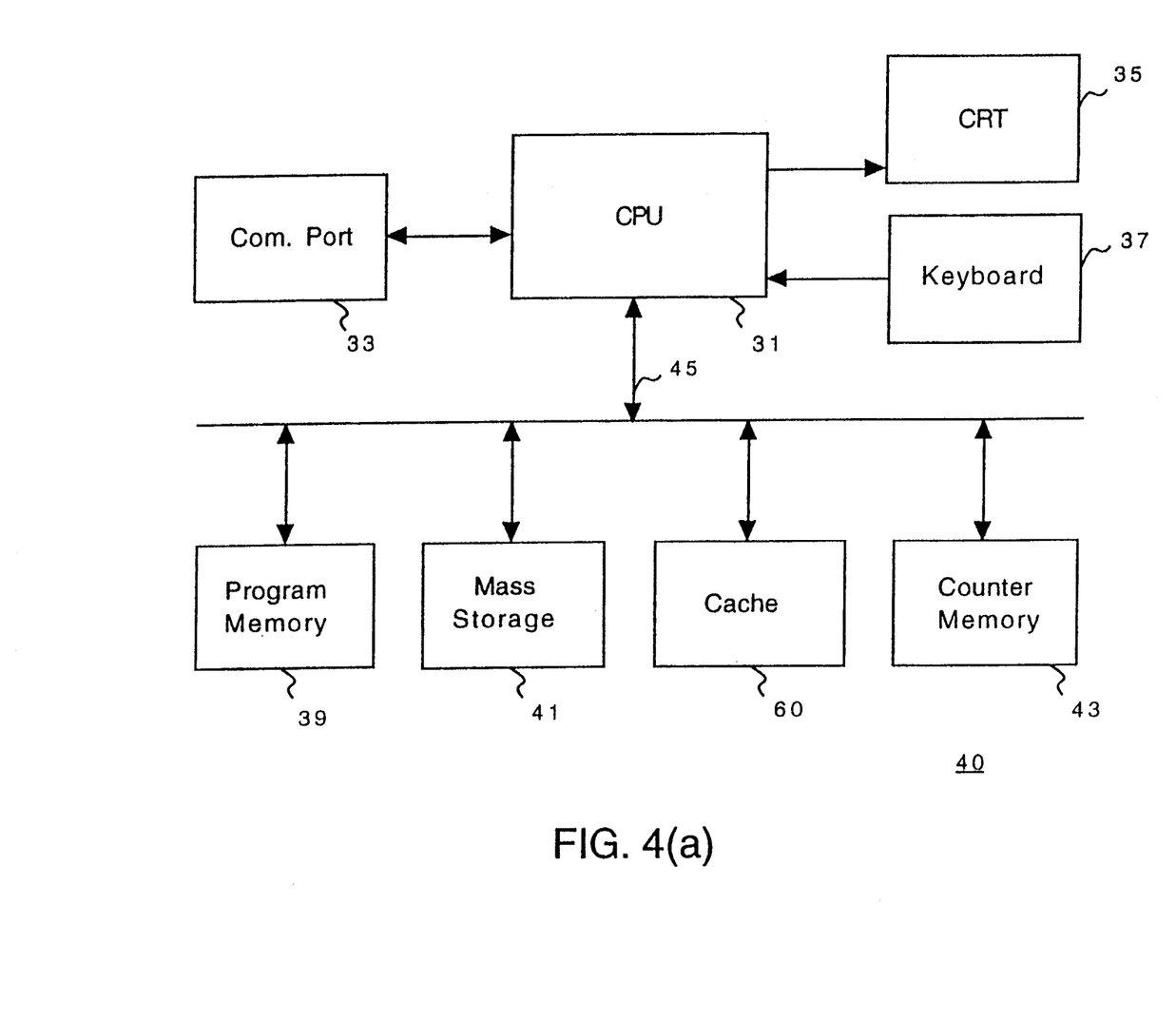
FIG. 4(a) is a block diagram showing a general purpose computer which is used to implement the cached encryption system of the present invention.
Figure 4B:
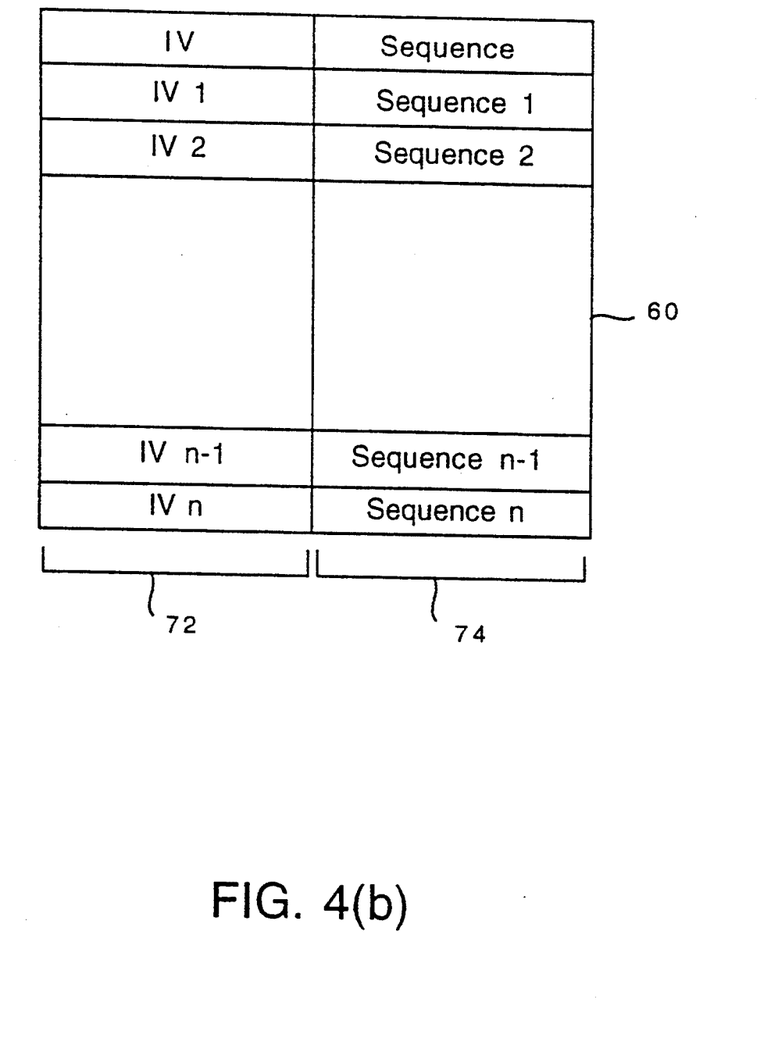
FIG. 4(b) is a table showing the arrangement of cached data of the present invention, in which each member of a list of initialization vectors is stored together with its corresponding pseudorandom sequence.

The encryption-decryption system of the present invention consists of a unique combination of digital functional blocks, all of which are separately conventional and well understood in the art. The system is preferably implemented on a general purpose computer using programmed instructions; however, the discussion which follows teaches the invention in terms of functional blocks which may be readily implemented using conventional discrete or integrated digital circuitry. The preferred implementation is described with reference to FIGS. 4 and 5 below.

Figure 2:
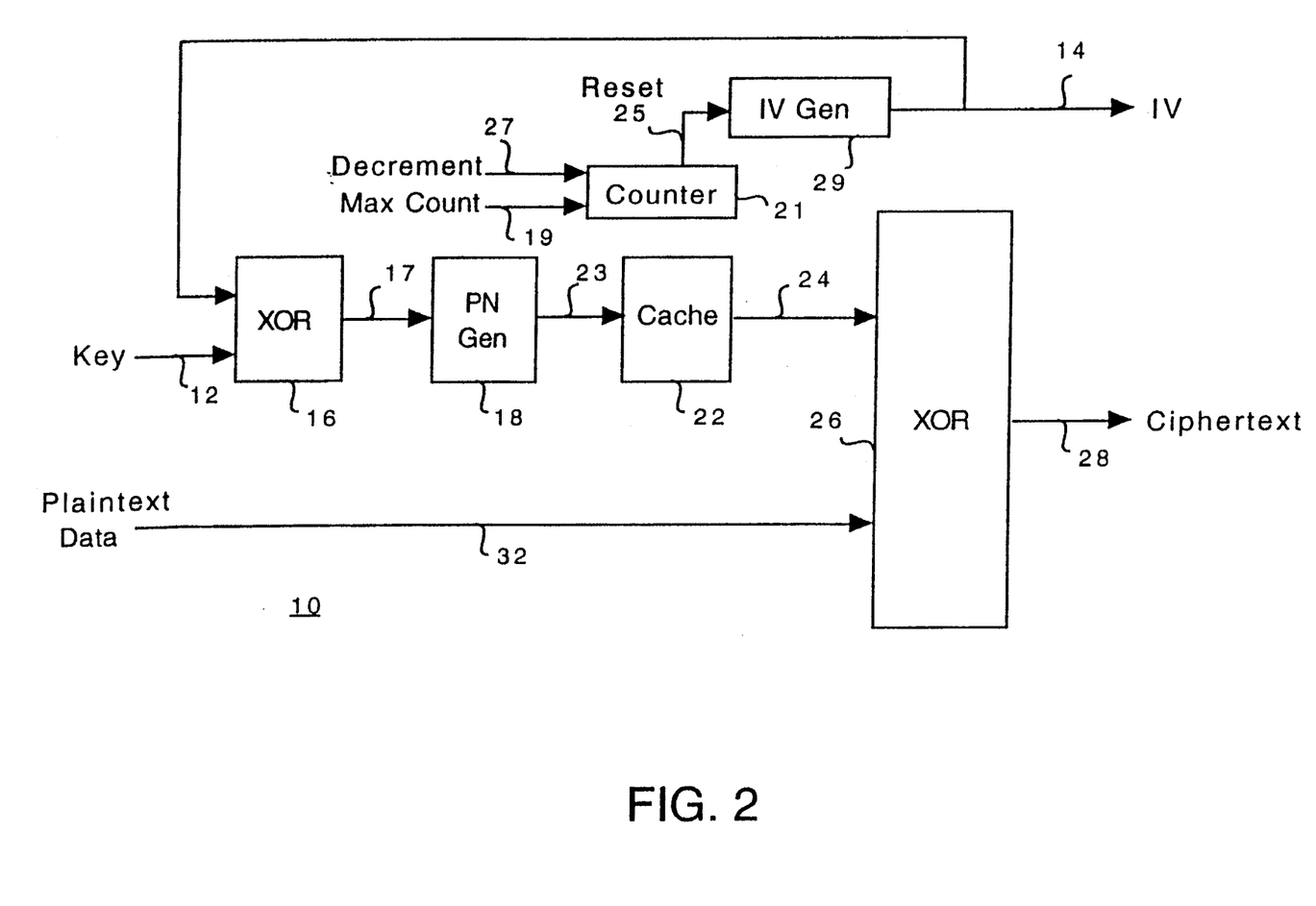
FIG. 2 is a block diagram showing the transmitter of the variable-overhead cached encryption system of the present invention.

Referring now to FIG. 2, a transmitter 10 is shown for encrypting plaintext data 32 into ciphertext 28. Plaintext data 32 is digital information which may be readily understood by both a sender and a receiver and may also be readily understood by other unauthorized third parties having access to the communications channel. The function of transmitter 10 is to encode or encrypt the plaintext data 32 in such a way that the information is usable only to a receiver having a bona fide access to the data. A central feature of transmitter 10 is a key 12 which is secret as to third parties but shared between the transmitter and a receiver 20 (shown in FIG. 3) of data 32. As discussed with reference to FIG. 1(a), key 12 would ideally be infinite in length and would be unique as to every message communicated between the transmitter 10 and the receiver 20. In practice, however, key 12 is relayed only periodically between the transmitter 10 and the receiver 20 and during the periods between the relay of the key, the key is used repetitively to encrypt plaintext data 32 from transmitter 10 before transmission to receiver 20.

An initialization vector (IV) 14 is produced by IV generator 29 and utilized by the transmitter 10 and receiver 20 to extend the usability of the key 12. The key 12 is a relatively expensive component to generate and maintain. The key 12 must be randomly generated and must be securely transmitted between transmitter 10 and receiver 20 in a secure channel which is separate from the communication system through which ciphertext 28 is transmitted. Consequently, even though the security of the key 12 diminishes with each successive use, efficiency demands that maximum utilization of the key occurs. One way of extending the utilization of the key 12 is to combine the key with a local key such as the initialization vector 14. IV generator 29 generates a random sequence having the same length as key 12. Generator 29 repeats the same IV sequence until reset 25 signals that a new sequence is to be generated. Initialization vector 14 is combined with key 12 using a conventional exclusive-OR (XOR) gate 16 to produce a temporal key 17. Various other logical functions can be equivalently used in place of XOR gate 16 to mask the identity of the key. This logical function need not be invertable. The XOR function is applied bitwise and is defined by a logical "0" whenever all inputs are the same, and a logical "1" otherwise. Initialization vector 14 is transmitted to receiver 20 as part of the communication sequence containing the ciphertext output 28. Information transmitted from transmitter 10 to receiver 20 includes a block of ciphertext 28 concatenated with initialization vector 14. In essence, the initialization vector 14 becomes public in that it is transmitted in an unencrypted format and may be more easily appropriated by third parties. However, since initialization vector 14 is always encoded with key 12 to produce temporal key 17, the value knowing of this initialization vector is limited. Since the initialization vector 14 is merely a component of temporal key 17, it would be difficult to determine the value of the temporal key knowing only the value of the initialization vector.

Temporal key 17 acts as a seed to a Pseudorandom Number (PN) generator 18. PN generator 18 is a deterministic machine, conventional in the art, and characterized by the fact that given a specific input or seed value, a unique and repeatable output sequence of arbitrary length can be generated. This output sequence from PN generator 18 is referred to in FIG. 2 as a temporal sequence 23 and is equal in length to the longest anticipated plaintext data 32. Once generated, the temporal sequence 23, is then stored in cache 22, a conventional memory register. The contents of cache 22 is then written as a PN sequence to XOR gate 26. XOR gate 26 is similar in construction to XOR gate 16 and is used to combine the PN sequence 24 with the plaintext data 32 to produce ciphertext 28.

An additional feature of the present invention is counter 21, which controls the generation of new initialization vectors 14 and thereby the security level of the encryption system. Cache 22 contains the temporal sequence 23 produced by the PN generator 18 in response to the input combination of the initialization vector 14 and the key 12. In the preferred embodiment, cache 22 is designed to contain one or more temporal sequences 23 arranged as a function of initialization vectors 14. For a specific initialization vector 14, a corresponding temporal sequence 23 will be stored. A further discussion of the implementation of cache 22 can be found with reference to the discussion of FIGS. 4(a) and 4(b) below. Counter 21 selectively resets IV generator 29, enabling the iterative reuse of a specific initialization vector 14 and corresponding temporal sequence 23 in order to improve the efficiency of the transmitter 10. The counter 21 is operated by initially loading a maximum count signal 19 into the counter 21. As each new data sequence 32 is present, a decrement signal 27 instructs counter 21 to decrement. When counter 21 decrements to zero, then a new initialization vector 14 is subsequently utilized by XOR 16 in generating a new temporal key 17. With each sequence of plaintext data 32 combined in XOR gate 26, a PN sequence 24 of identical length is read from cache 22 by XOR 26. With each new plaintext date 32 sequence, the decrement signal 27 reduces the counter 21 contents by one. The encrypting process proceeds in XOR gate 26, reading PN sequences 24 and decrementing counter 21 until the counter 21 contents reaches zero causing the IV generator 29 to reset. Resetting the IV generator 29 results in the generation of a new initialization vector 14. Counter 21 has been described with respect to FIG. 2 as a plaintext data 32 sequence counter, decrementing with each sequence processed. Counter 21 equivalently implements a timer or clock function, resetting the IV generator 29 after a period of time set by Max Count 21. In this way, initialization vector 14 extends the usability of the key 12 by making the corresponding PN sequence 24 more difficult to determine. Use of counter 21 and cache 22 serve the purpose of reducing the costly overhead associated with generating PN sequences 24 by reusing the sequences generated and stored in the cache 22. The counter 21 enables variability of the overall security of the transmitter 10 and receiver 20 by providing a selection of the number of times each specific temporal sequence 23 is used in the encoding of data. In the preferred embodiment, the counter 21, reset 25, maximum count 19, and decrement 27 signals are implemented in the central processing unit of a conventional general purpose computer.

Figure 3:
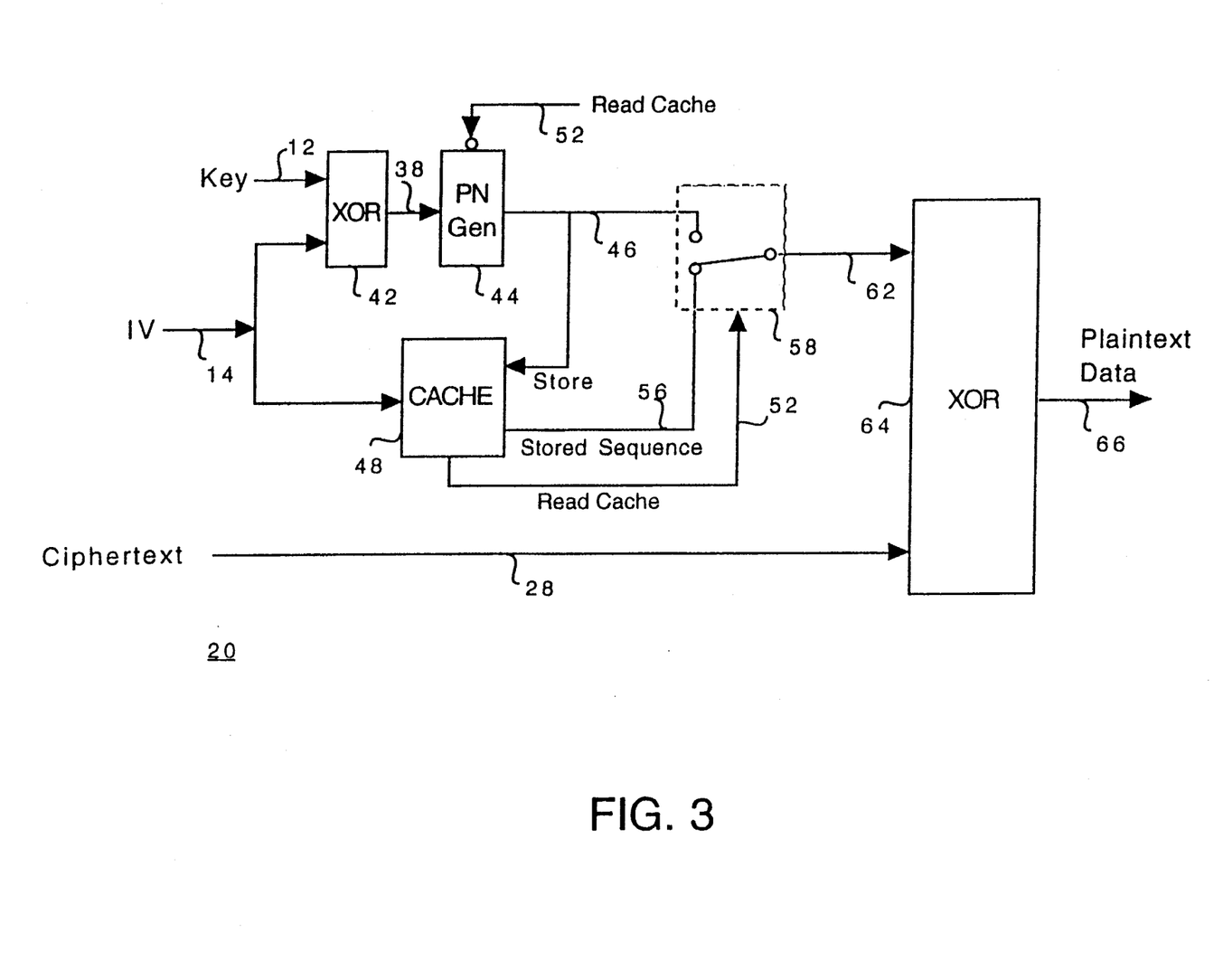
FIG. 3 is a block diagram showing the receiver of the variable-overhead cached encryption system of the present invention.

Referring now to FIG. 3, a receiver 20 is shown in which a ciphertext 28 is decoded to produce an unencrypted plaintext data 66 which is identical to the plaintext data 32 sequence of transmitter 10. As the communication sequence containing an initialization vector 14 and a block of ciphertext 28 is imported by receiver 20, the initialization vector 14 is stripped off and applied to cache 48 and to XOR gate 42. Other functions may be equivalently substituted in place of XOR gate 42; however, gate 16 and gate 42 must be identical. Initialization vector 14 is then compared in cache 48 with other initialization vectors stored in cache 48 to determine whether the specific initialization vector 14 has previously been received and stored. If the specific initialization vector 14 is found to be stored in cache 48, then the PN sequence associated with that initialization vector is written to an XOR gate 64, and the stored PN sequence is used to decode the imported ciphertext 28. When a match of the received initialization vector 14 is made to a stored initialization vector in cache 48, read cache signal 52 instructs multiplexer 58 to route the stored sequence 56 output to the XOR gate 64. From the viewpoint of the XOR gate 64, the PN sequence stored in cache 48 becomes the selected sequence and is delivered through multiplexer 58 via the stored sequence 56 output of the cache.

If a determination is made that the initialization vector 14 has not been previously received, then the read cache signal 52 of cache 48 signals multiplexer 58 to connect the PN generator 44 to the XOR gate 64. In this event, initialization vector 14 is used in producing a temporal key 38 input to PN generator 44 to generate a new PN sequence 46 identical to the corresponding PN sequence 23 used in the encoding of the ciphertext 28 by the transmitter 10. The read cache signal 52 is then inverted and used to enable the output of the PN generator 44. Just as in the case with the transmitter 10, initialization vector 14 is combined with key 12 in XOR gate 42 to produce a temporal key 38. It should be noted that this temporal key 38 is identical to the corresponding temporal key 17 produced in the transmitter 10 by the XOR gate 16 combination of key 12 and initialization vector 14. PN generator 44 receives temporal key 38 to produce a PN sequence 46, which is then connected via multiplexer 58 to XOR gate 64 as a selected sequence 62. In order to improve the efficiency of future decoding of ciphertext 28 utilizing this specific initialization vector 14, the PN sequence associated with the initialization vector is then stored in cache 48 together with its corresponding initialization vector. When the next block of ciphertext 28 is received using the same initialization vector 14, the PN sequence 46 need not be regenerated by PN generator 44, but rather may be read from cache 48 as a stored sequence 56. It should further be noted that the imported initialization vector 14 has a dual purpose: it is used both as a component of the temporal key 17 for generating PN sequence 46 and as an input to cache 48 for the purpose of determining whether there exists a stored sequence 56 corresponding to the imported initialization vector 14. The XOR gate 64 combines the selected sequence 62 with ciphertext 28 to produce plaintext data 66 which is identical in content to the corresponding plaintext data 32 originally encoded in transmitter 10.

An important benefit of the encryption system of the present invention is that the transmitter 10 and receiver 20 are self-synchronizing. That is, assuming the key is shared, everything needed to decode a block of transmitted data is contained within the message. Knowledge of prior messages or sequences is not required.

Referring now to FIG. 4(a), a diagram is shown of a general purpose computer 40 used for the preferred implementation of the encryption system shown in FIGS. 2 and 3. The preferred implementation of the present invention consists of programmed instructions implemented on an Apple Macintosh ® computer, manufactured by Apple Computer, Inc. of Cupertino, Calif. The general method steps, described below, can be equivalently implemented on any general purpose computer and many other programmable processor-based systems. The general purpose computer 40 consists of a CPU 31 attached to a number of processing components. CPU 31 contains a keyboard 37 and a CRT 35 through which a user can interact with CPU 31. The CPU 31 is connected to a communication port 33 for interfacing with other processors and communication devices, such as modems and area networks. CPU 31 further comprises a data bus 45 for connecting various memories, including program memory 39, cache memory 60, counter memory 43, and mass storage 41. Program memory 39 contains operating instructions for directing the control of CPU 31. Cache 60 contains high speed temporary memory for use by CPU 31 in executing the encryption and decryption program instructions of the present invention. Also attached to data bus 45 is mass storage 41 which contains stored data, utilized by CPU 31 in executing program instructions from program memory 39.

Referring also to FIGS. 2 and 3, the XOR gates 16, 26, 42 and 64 are implemented by CPU 31 using Boolean arithmetic; counter 21 is implemented using counter memory 43; and the caches 22 and 48 are implemented using cache 60 memory. PN generator 18 and 44 are implemented by the CPU 31 using a conventional pseudorandom number generator algorithm. Computer system 40 can implement the encryption system in a number of ways. A first computer system can act as a transmitter 10 and export ciphertext to a second computer system via the communication port 33. In this operation mode, the first computer acts as transmitter 10 while the second computer acts as receiver 20. This first mode of operation provides for a secure transmission of sensitive data.

In an alternative operating mode, a single computer system 40 acts as both a transmitter 10 and as a receiver 20, storing ciphertext to mass storage 41 and later retrieving the stored ciphertext for decoding and use. The purpose of this second mode of operation is to allow for the secure storage of sensitive data.

Referring now to FIG. 4(b), a memory map of cache 60 is shown in which a list of initialization vectors 72 are paired with corresponding sequences 74. The entry "IV 1" has a corresponding "Sequence 1", "IV 2" has a corresponding "Sequence 2", and "IV n" has a corresponding "Sequence n". Cache 60 memory provides a functional implementation of cache 22 in FIG. 2, when computer system 40 is operating as a transmitter 10, and provides an implementation of cache 48 in FIG. 3, when the computer system is operating as a receiver 20. The counter 21 output in transmitter 10 is implemented as a CPU 31 function in which the CPU reads and decrements the contents of counter memory 43 each time a PN sequence is utilized to encode a sequence of plaintext data 32.

Figure 5:
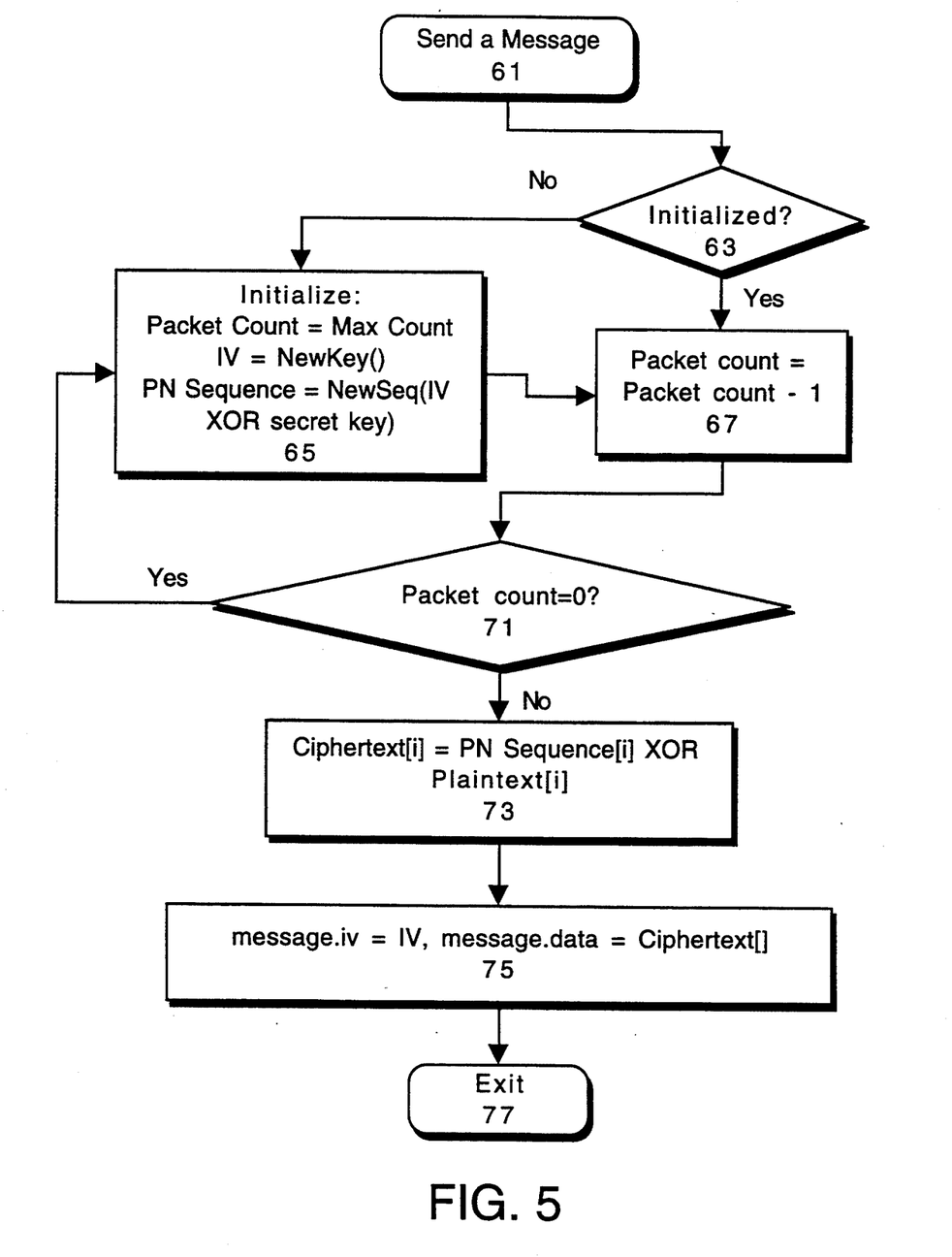
FIG. 5 is a flow diagram showing the method steps of transmitting encrypted data using the apparatus of FIG. 2.

Referring now to FIG. 5, a flow chart is shown outlining the programmed instruction steps which are executed by the general purpose computer 40, acting in the mode of a transmitter 10 (FIG. 2) in encrypting plaintext data to produce the ciphertext 28 of the present invention. Step 61 is the entry point for the encrypting instructions of FIG. 5. If step 63 determines that the routine variables have not been initialized, CPU 31 initializes the routine variables in step 65 by setting the packet count to Max Count generating an Initialization Vector (IV), and setting the PN Sequence to the value NewSeq(IV XOR Secret Key). The variable IV is equal to the initialization vector 14 and the variable Secret Key is a previously determined and stored value equal to key 12. The function "NewSeq()" is a conventional algorithm for pseudorandom number generation, using the values of IV and Secret Key as seed components. For example see Blahut, Richard, *Digital Transmission of Information*, Addison Wesley Publishing Company, 1990, p 497. The variable Packet Count represents the maximum number of times that a particular initialization vector can be used in the generation of a PN sequence 24. The maximum value (Max Count) for the variable packet count is equal to the maximum count signal 19. In step 67, packet count is decremented by one, and in step 71 the CPU 31 tests whether Packet Count is equal to zero. If Packet Count is equal to zero, then the program returns to the initialization step in 65. In the event that packet count is not equal to zero, a Ciphertext sequence is calculated in step 73 using the formula:

$$\text{Ciphertext}[i] = \text{PN Sequence}[i] \text{ XOR Plaintext}[i]$$

where i is an indexing integer ranging from zero to one less than the length of the plaintext sequence in bits. It should be noted that in this preferred method, the length of the plaintext, PN, and ciphertext sequences are all of equal length. Following the calculation of the ciphertext sequence, data strings called "message.iv" and "message.data" are generated, in which message.iv is set equal to the initialization vector sequence and message.data is set equal to the ciphertext sequence. The routine exits 77 at which time CPU 31 transmits message.iv and message.data as a concatenated data string to communication port 33 or to mass storage 41 for transmission or storage.

Figure 6:
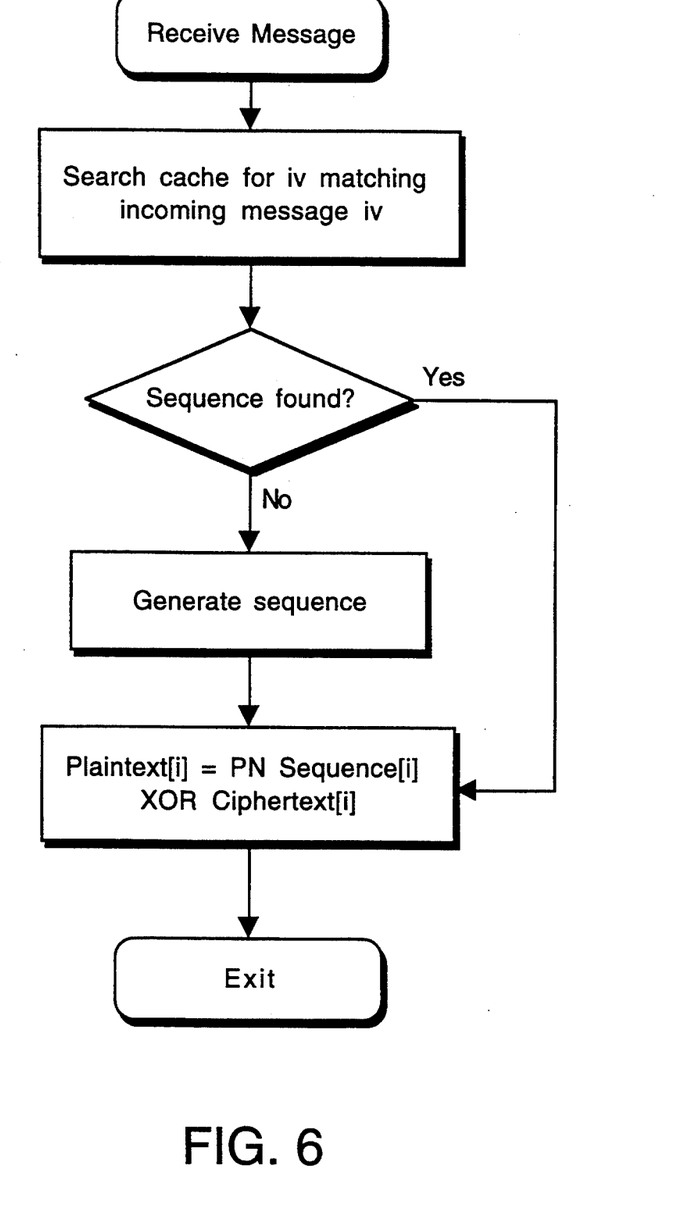
FIG. 6 is a flow diagram showing the method steps of receiving encrypted data using the apparatus of FIG. 3.

Referring now to FIG. 6, with the computer 40 acting in the mode of a receiver 20 (FIG. 3), the concatenated data string containing message.iv and message.data is received by CPU 31 in step 87, and the initialization vector and ciphertext sequences are separated. Using the initialization vector component (message.iv), a search 89 of cache 60 is made for an initialization vector matching the incoming message.iv. Since each initialization vector in cache 60 is matched to a PN sequence, locating a matching initialization vector to the incoming message.iv provides identification of the PN sequence used to encrypt the incoming message.data. If the message.iv can be matched 91 to a stored IV and PN sequence, the receiver 20 will not have to expend the overhead of creating a new PN sequence to decode the message.data sequence. If the sequence is found in the cache 60, then the plaintext data is determined 95 using the formula:

Plaintext[i] = PN Sequence[i] XOR Ciphertext[i]

If the sequence is not found 91 in the cache 60, then CPU 31 generates 93 the sequence using the same pseudorandom number generation routine used in step 65 of FIG. 5, wherein:

PN Sequence = NewSeq(IV XOR Secret Key)

This PN Sequence is stored in cache 48 and then used in step 95 to recover the plaintext data 66. The routine exits in step 97.

The invention has now been explained with reference to specific embodiments. Other embodiments will be apparent to those of ordinary skill in the art in light of this disclosure. For example, the invertable function described in the preferred embodiment is an XOR function. Other invertable functions are equivalently effective. Also the counter 21 is shown as a "preset with decrement-to-zero" function. Alternative up-counters and the CPU-implemented increment-and-compare functions are viewed as equivalents with respect to the present invention. Therefore, it is not intended that this invention be limited, except as indicated by the appended claims.

What is claimed is:

1. An apparatus for decryption using cache storage, the apparatus comprising:
   a memory for storing at least one number sequence;
   a control signal responsive to the contents of the memory which indicates whether a selected number sequence is stored in the
   a switch having a first sequence input coupled to the output of the memory, for selectively outputting the first sequence input responsive to the indication of the control signal; and
   a decoder which receives the output of the switch as a first input and receives encrypted data as a second input, and combines these first and second inputs to produce decrypted data.

2. The apparatus according to claim 1, further comprising:
   a PN generator which generates and provides as an output the selected number sequence.

3. The apparatus according to claim 2, wherein the switch further comprises a second sequence input coupled to a first output of the PN generator, and the switch outputs one of the sequence inputs responsive to the indication of the control signal.

4. The apparatus according to claim 2, wherein a second output of the PN generator is coupled to the memory.

5. The apparatus according to claim 1, wherein the decoder is an exclusive-OR gate.

6. The apparatus according to claim 1, wherein the number sequence is a Pseudorandom Number sequence.

7. The apparatus according to claim 3, wherein the memory stores a new number sequence from the PN generator in response to the indication of the control signal when the decoder is receiving data from the second sequence input.

8. A decryption system comprising:
   means for storing unique pairs of initialization vectors and pseudorandom numbers;
   means for searching the storage for a unique initialization vector and pseudorandom number pair having an initialization vector which matches an imported initialization vector; and
   means for decrypting imported ciphertext using the pseudorandom number corresponding to the matched initialization vector.

9. The decryption system according to claim 8, further comprising means for generating the pseudorandom number corresponding to the imported initialization.

10. The decryption system according to claim 9, further comprising means for selectively using the generated pseudorandom number to decrypt the imported ciphertext.

11. The decryption system according to claim 8, further comprising means for importing the ciphertext in concatenated combination with an initialization vector.

12. The decryption system according to claim 11, further comprising means for separating the ciphertext from the initialization vector in the concatenated combination.

13. The decryption system according to claim 9 wherein the means for generating a pseudorandom number from the imported initialization vector further comprises means for storing the generated pseudorandom number and its corresponding initialization vector in storage for future use in decrypting.

14. The decryption system according to claim 8 wherein the means for decrypting the imported ciphertext, further comprises means for logically combining the imported ciphertext with the stored pseudorandom sequence.

15. A method for decryption using cache storage, the method comprising the steps:
   storing unique pairs of initialization vectors and pseudorandom numbers;
   searching the storage for a unique initialization vector and pseudorandom number pair having an initialization vector which matches an imported initialization vector; and
   decrypting imported ciphertext using the pseudorandom number corresponding to the matched initialization vector.

16. The method according to claim 15, wherein following the step of storing unique pairs of initialization vectors and pseudorandom numbers, the method further comprises the step of importing the ciphertext in concatenated combination with an initialization vector.

17. The method according to claim 16 further including the step of separating the ciphertext from the initialization vector in the concatenated combination.

18. The method according to claim 15, wherein the step of decrypting the imported ciphertext further comprises the step of logically combining the imported ciphertext with the stored pseudorandom sequence.

19. A system for decrypting an encrypted data sequence comprising:
 a random number generator which combines a secret key with an initialization sequence of data to produce a decryption sequence of data;
 a memory coupled to the random number generator which stores the decryption sequence produced by the random number generator; and
 a decoder coupled to the random number generator and to the memory which receives a sequence of ciphertext associated with the initialization sequence and decodes the ciphertext by combining the ciphertext with a corresponding decryption sequence stored in the memory if the decryption sequence corresponding to the associated initialization sequence is stored in memory, otherwise the decoder decodes the ciphertext by combining the ciphertext with a decryption sequence from the random number generator if the corresponding decryption sequence is not stored in memory.

20. The system for decrypting according to claim 19, further comprising a switch having an output coupled to the decoder, a first input coupled to the random number generator, and a second input coupled the memory.

21. The system for decrypting according to claim 20, wherein the switch selectively propagates one of the first or second inputs depending on whether the decryption sequence corresponding to the associated initialization sequence is stored in the memory.

* * * * *